May 23, 1944.　　　C. M. KOUBA　　　2,349,503
MICRO BORING AND TURNING DEVICE
Filed Aug. 6, 1943
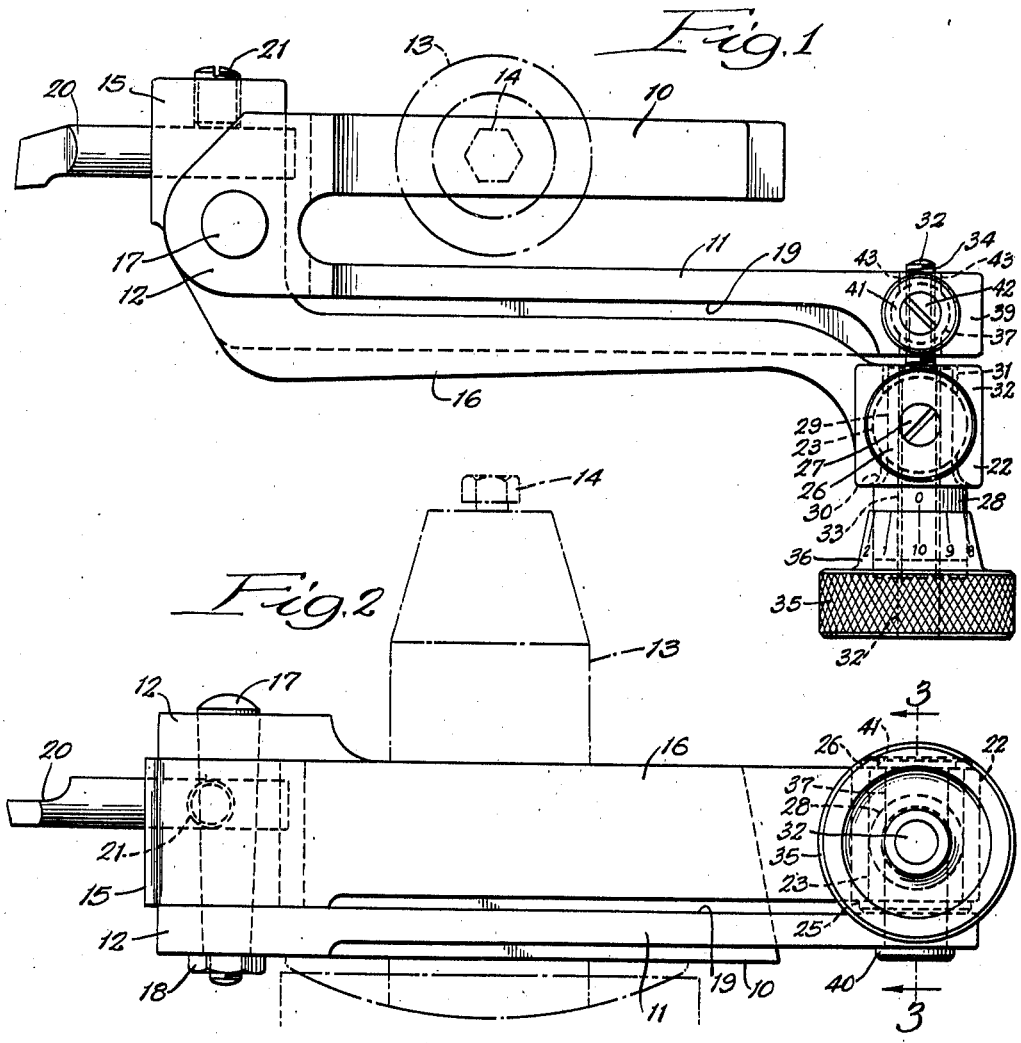

Patented May 23, 1944

2,349,503

UNITED STATES PATENT OFFICE 2,349,503

MICRO BORING AND TURNING DEVICE

Charles M. Kouba, Chicago, Ill., assignor of one-half to Gay M. Bonebrake, Chicago, Ill.

Application August 6, 1943, Serial No. 497,695

8 Claims. (Cl. 29—98)

My invention contemplates and provides a micro boring and turning device—i. e., an instrumentality, mountable in the tool post or equivalent part of a lathe or other machine tool, with which may be effected unusually minute and extremely accurate adjustments of a tool with respect to its work piece.

An object of the invention is to provide a micro boring and turning device with the aid of which boring and turning operations within tolerances of the order of one ten thousandth of an inch may be effected as matters of shop routine by machine tool operators endowed with but ordinary mechanical abilities.

Another object of the invention is to provide a micro boring and turning device which is compact, easy to operate, and very sturdily constructed.

Still another object of the invention is to provide, as part of a micro boring and turning device, a novel, simple and remarkably reliable micrometer mechanism.

A preferred embodiment of my invention, which of course may be modified in many particulars within the limits of the appended claims, comprises: (a) a generally U-shaped support having one leg mountable in the tool post of a lathe or other suitable machine tool, (b) a bell crank lever having one arm substantially longer than the other, pivoted to the support with its long arm disposed alongside that leg of the support which is not mountable in the tool post, (c) a tool mounted in the short arm of the lever, and (d) a unique micrometer mechanism comprising inter alia a duplex screw, acting between the long arm of the lever and an opposed portion of that support leg alongside which the long arm of the lever is disposed.

Other features, objects and advantages of my invention will appear from the following detailed description wherein reference is made to the accompanying sheet of drawings in which:

Figure 1 is a top plan view of the device of the present invention;

Figure 2 is a side elevational view thereof; and

Figure 3 is a view, partly in section and partly in elevation, taken in the vertical plane of line 3—3 of Figure 2 and looking in the direction indicated by the arrows.

Similar reference numerals refer to similar parts throughout the several views.

My new device, in the form thereof depicted by the accompanying drawings, comprises a generally U-shaped one-piece support consisting of a first leg 10, a second and conveniently longer leg 11, and a pair of vertically spaced-apart ears or webs 12—12. The support leg 10 has a transverse cross section approximating that of an ordinary tool shank, so that it may be received and screw-clamped in the tool post of a lathe or other machine tool. A conventional tool post and its associated clamping screw are indicated, at 13 and 14 respectively, by dot-and-dash lines in Figures 1 and 2.

A bell crank lever, comprising a short arm 15 and a substantially longer arm 16, is pivoted in the embrace of the ears or webs 12—12 by a conical pin 17 which occupies accurately machined conical bores in the parts through which it extends and is threaded at its lower end for cooperation with nut 18.

Initially the pin 17 is snugly rotatable in each of the conical bores through which it extends, but it may become frozen in either its lever bore, or one or both of its ear bores, without impairing the efficacy of the lever. The opposed plane surfaces of the lever and of the ears between which it is pivoted are accurately finished and snugly contacting.

The arm 11 of the support is preferably provided with a longitudinal rabbet 19 in which the longer arm 16 of the lever is partially nested. A suitable tool 20, for engagement with a work piece, has its shank firmly held by a set screw 21 in an appropriate passage or socket 21 formed in the short arm 15 of the lever.

I shall now describe the novel, simple and remarkably reliable micrometer mechanism to which I have previously alluded.

The enlarged extremity 22 of the lever 16 is provided with a vertical bore 23. Snugly disposed in the bore 23, and oscillatory therein around an axis parallel with the axis of the pivot pin 17, is a cylinder 24. Axial movement of cylinder 24 is prevented by its integral flange 25 and its cap disc 26 which is held in position by screw 27.

Oscillatory cylinder 24 serves as a carrier for a sleeve 28 having differential external diameters and, for that reason, is provided with a diametrical bore 29 in which the smaller diameter portion of the sleeve 28 has a force fit. Aligned apertures 30 and 31 are formed in the lever extremity 22 to permit the sleeve 28 to be force-fitted into the cylinder 24 as shown, such apertures 30 and 31 being of greater diameters than the sleeve portions which lie therein, and therefore permitting a certain amount of oscillation of the cylinder 24 and sleeve 28, around the vertical axis of the cylinder 24, with respect to the lever extremity 22.

Sleeve 28 functions as the nut for the larger diameter portion of a duplex micrometer screw 32 having threaded portions 33 and 34 of differential diameters. The knurled head 35 of the micrometer screw is provided with a collar 36 which rotatably embraces the contiguous larger diameter portion of the sleeve 28. Collar 36 is marked with suitable graduations to facilitate its rotative adjustment with respect to an index line marked upon such embraced portion of the sleeve 28.

The threads of the screw portions 33 and 34 are differentially pitched; e. g., the thread of portion 33 may be one having twenty-nine convolutions per inch and the thread of portion 34 may be one having twenty-eight convolutions per inch.

The smaller diameter portion 34 of the screw has for its nut a cylinder 37 which is disposed in a vertical bore 38 formed in the enlarged extremity 39 of support leg 11. Axial movement of cylinder 37 is prevented by its integral flange 40 and its cap disc 41 retained by screw 42. Apertures 43—43, which are formed in the leg support extremity 22, accommodate their screw portion 34 with such clearance as not to interfere with a limited amount of oscillatory movement of cylinder 37 and screw portion 34 with respect to such leg support extremity 22.

Extremely small, and very accurate, adjustments of the tool 20 with respect to its work piece may be effected by manipulation of the screw head 35—the cylinders 24 and 37 oscillating to prevent any binding of the micrometer screw as tiny modifications of the angularity between support leg 11 and lever arm 16 are caused by micrometer screw rotation.

Having thus illustrated and described a preferred embodiment of my invention, what I claim as new and desire to secure by Letters Patent of the United States is:

1. A micro boring and turning device comprising a support provided with a shank receivable in the tool post of a lathe or other suitable machine tool, a lever pivoted to the support, a tool carried by the lever, an oscillatory nut element carried by the lever at a point remote from its pivot, an opposed oscillatory nut element carried by the support, said nut elements oscillating around axes parallel with the lever axis, and a micrometer screw having threaded portions provided with threads of different pitch, each of said threaded portions cooperating with one of said oscillatory nut elements.

2. A micro boring and turning device comprising a support mountable in the tool post of a lathe or other machine tool, a lever pivoted to the support, a tool carried by the lever, and micrometer mechanism carried by and acting between the support and the lever to effect adjustments of the lever with respect to the support, said micrometer mechanism including a duplex screw having threaded portions provided with threads of different pitch, one of said threaded portions having as its cooperating nut element an oscillatory member carried by the support, and the other of said threaded portions having as its cooperating nut element an oscillatory member carried by the lever, said nut elements oscillating around axes parallel with the lever axis.

3. A micro boring and turning device comprising a generally U-shaped support having one leg mountable in the tool post of a lathe or other machine tool, a bell crank lever pivoted to the support at the end thereof where its legs are joined, a tool carried by one arm of the lever, the other leg of the support and the other arm of the lever being disposed alongside each other, and micrometer mechanism carried by and acting between the last mentioned leg and the last mentioned lever arm to effect adjustments of the lever with respect to the support.

4. A micro boring and turning device comprising a generally U-shaped support having one leg mountable in the tool post of a lathe or other machine tool, a bell crank lever pivoted to the support at the end thereof where its legs are joined, a tool carried by one arm of the lever, the other leg of the support and the other arm of the lever being disposed alongside each other, and micrometer mechanism carried by and acting between the last-mentioned leg and the last mentioned lever arm to effect adjustments of the lever with respect to the support, said micrometer mechanism including a screw having threaded portions provided with threads of different pitch, one of said threaded portions having as its cooperating nut element an oscillatory member carried by the lever, and the other threaded portion having as its cooperating nut element an oscillatory member carried by the support, said nut elements oscillating around axes parallel with the lever axis.

5. A micro boring and turning device comprising a generally U-shaped support having one leg mountable in the tool post of a lathe or other machine tool, a bell crank lever pivoted to the support at the end thereof where its legs are joined, a tool carried by one arm of the lever, the other leg of the support and the other arm of the lever being disposed alongside each other with the leg provided with a longitudinal rabbet to accommodate the lever, and micrometer mechanism carried by and acting between the last mentioned leg and the last mentioned arm to effect adjustments of the lever with respect to the support.

6. A micro boring and turning device comprising a generally U-shaped support having one leg mountable in the tool post of a lathe or other suitable machine tool, the legs of the support being connected by spaced-apart webs which constitute lever pivoting ears, a bell crank lever lying between and pin-pivoted to said ears, one arm of the lever being shorter than the other, a tool carried by the short arm of the lever, the long arm of the lever being disposed alongside that leg of the support which is not mountable in the tool post, extremities of the last mentioned leg and the last mentioned arm lying closely adjacent to each other, a pair of oscillatory nut elements, each of such nut elements being carried by one of said extremities and oscillating around an axis parallel with the lever axis, and a micrometer screw having threaded portions provided with threads of different pitch, each of said threaded portions cooperating with one of said oscillatory nut elements.

7. A micro boring and turning device comprising a support mountable in the tool post of a lathe or other machine tool, a lever pivoted to the support, a tool carried by the lever, a pair of oscillatory nut elements, one of said nut elements being carried by the lever and the other by the support, said nut elements oscillating around axes parallel with the lever axis, and a micrometer screw having threaded portions provided with threads of different pitch, each of said threaded portions cooperating with one of said oscillatory nut elements.

8. A micro boring and turning device comprising a support mountable in the tool post of a lathe or other machine tool, a lever pivoted to the support, a tool carried by the lever, and micrometer mechanism carried by and acting between the support and the lever to effect adjustments of the lever with respect to the support, said micrometer mechanism including a duplex screw having threaded portions provided with threads of different pitch, one of said threaded portions having a cooperating nut element carried by the support, and the other of said threaded portions having a cooperating nut element carried by the lever, at least one of said nut elements oscillating around an axis parallel with the lever axis.

CHARLES M. KOUBA.